United States Patent
Salahshoor (10) Patent No.: US 11,643,912 B2
(45) Date of Patent: May 9, 2023

(54) APPLICATION OF ENZYME-BASED GREEN SOLVENTS FOR THE RECOVERY OF SUBSURFACE FLUIDS

(71) Applicant: GAS TECHNOLOGY INSTITUTE, Des Plaines, IL (US)

(72) Inventor: Shadi Salahshoor, Northbrook, IL (US)

(73) Assignee: GAS TECHNOLOGY INSTITUTE, Mount Prospect, IL (US)

( * ) Notice: Subject to any disclaimer, the term of this patent is extended or adjusted under 35 U.S.C. 154(b) by 0 days.

(21) Appl. No.: 17/175,116

(22) Filed: Feb. 12, 2021

(65) Prior Publication Data
US 2021/0262328 A1     Aug. 26, 2021

Related U.S. Application Data (60) Provisional application No. 62/978,987, filed on Feb. 20, 2020.

(51) Int. Cl.
*E21B 43/16*     (2006.01)
*C09K 8/58*     (2006.01)

(52) U.S. Cl.
CPC ............... *E21B 43/16* (2013.01); *C09K 8/58* (2013.01)

(58) Field of Classification Search
CPC .................................. E21B 43/16; C09K 8/58
See application file for complete search history.

(56) References Cited

U.S. PATENT DOCUMENTS

| | | | |
|---|---|---|---|
| 7,032,662 B2 * | 4/2006 | Malone | C09K 8/92 166/252.6 |
| 7,530,265 B2 * | 5/2009 | DiFoggio | G01N 33/2823 73/152.42 |
| 8,949,029 B2 * | 2/2015 | Nyhavn | E21B 43/14 702/6 |
| 9,725,640 B2 | 8/2017 | Tang et al. | |
| 2001/0036667 A1 * | 11/2001 | Tayebi | G01N 33/24 436/56 |
| 2003/0220204 A1 | 11/2003 | Baran, Jr. et al. | |
| 2008/0115945 A1 | 5/2008 | Lau et al. | |

(Continued)

FOREIGN PATENT DOCUMENTS

| EP | 2 804 186 A1 | 11/2014 |
|---|---|---|
| WO | WO 2013/160334 A1 | 10/2013 |

OTHER PUBLICATIONS

U.S. Patent Office, English language version of the International Search Report, Form PCT/ISA/210 for International Application PCT/US2021/018866, dated May 4, 2021 (2 pages).

(Continued)

*Primary Examiner* — Silvana C Runyan
(74) *Attorney, Agent, or Firm* — Pauley Erickson & Swanson (57) ABSTRACT

A method for recovering subsurface fluid from rock formations by adding an enzyme-based green solvent to a carrier fluid and injecting the enzyme-based green solvent and the carrier fluid into a production well. The enzyme-based green solvent and the carrier fluid are directed down a flow path of the production well. The solvent soaks in the production well before reversing the flow path of the production well. The enzyme-based green solvent and the carrier fluid travel up the flow path with a plurality of recovered deposits from the production well in the enzyme-based green solvent.

18 Claims, 7 Drawing Sheets

(56) References Cited

U.S. PATENT DOCUMENTS

| | | |
|---|---|---|
| 2008/0142230 A1 | 6/2008 | Lau et al. |
| 2008/0196892 A1 | 8/2008 | Lau et al. |
| 2008/0236832 A1 | 10/2008 | Fu et al. |
| 2013/0161008 A1 | 6/2013 | Klingler et al. |
| 2016/0340569 A1 | 11/2016 | Belcher et al. |
| 2017/0152426 A1 | 6/2017 | Huang et al. |
| 2017/0204316 A1* | 7/2017 | Pop ..................... C09D 133/00 |
| 2019/0144738 A1* | 5/2019 | Agrawal ................ C09K 8/605 |
| | | 166/280.2 |

OTHER PUBLICATIONS

U.S. Patent Office, English language version of the Written Opinion of the ISA, Form PCT/ISA/237 for International Application PCT/US2021/018866, dated May 4, 2021 (6 pages).

\* cited by examiner

5 w.t.% Enzyme Solution    0.5 w.t.% Surfactant Solution

FIG. 9

5 w.t.% Enzyme    0.5 w.t.% Surfactant

APPLICATION OF ENZYME-BASED GREEN SOLVENTS FOR THE RECOVERY OF SUBSURFACE FLUIDS

CROSS REFERENCE TO RELATED APPLICATION

This application claims the benefit of U.S. provisional application, Ser. No. 62/978,987 filed on 20 Feb. 2020. The provisional application is hereby incorporated by reference herein in its entirety and is made a part hereof, including but not limited to those portions which specifically appear hereinafter.

BACKGROUND OF THE INVENTION

Field of the Invention

This invention relates generally to the recovery of fluids with an enzyme-based green solvent and, more particularly, to improvement of hydrocarbon recovery from an unconventional reservoir during primary, secondary, or tertiary production, while minimizing unfavorable impacts on formation fluid and rock systems and improving environmental profile through green chemistry and manufacturing

Description of Related Art

Unconventional hydrocarbon deposits are very diverse and difficult to characterize overall, but in general have characteristics such as low porosity, low permeability, low pressure, and presence of natural microfractures. Thus, these hydrocarbon deposits have defects such as difficult development and energy supplement, and a low degree of use. The Petroleum Resources Management System (PRMS) defines unconventional resources as conventional resources that are trapped in discrete accumulations related to a geological structure or stratigraphic condition. They are petroleum accumulations that are pervasive throughout a large area. Therefore, unconventional resources are geographically extensive accumulations of hydrocarbons held in low-permeability rock with diffusive boundaries and no obvious structural or stratigraphic traps.

The development of micro- to nano-scale pores in unconventional resources has resulted in rather high capillary resistance, therefore, unconventional resources are not significantly impacted by hydrodynamic influences and have non-buoyancy-driven migration. Examples of such unconventional resources include coalbed methane (CBM), basin-centered gas (low permeability marl, shale, dolomite or sand), oil shale (kerogen) deposits, heavy oil and tar sands, and tight gas and tight oil including their subtypes shale gas/oil. Unconventional Resources are oil or gas-bearing units that lack the permeability and porosity of conventional resources. Hence, the unconventional resource requires specialized extraction technology (e.g., hydraulic fracturing stimulation for tight oil/gas, dewatering on CBM, steam and/or solvent for mobilizing natural bitumen, and surface mining of oil sands) to achieve economic production.

Oil recovery factors from majority of shale and tight formations are reported to be less than 10%. Therefore, enhanced oil recovery (EOR) techniques are massively explored to help with improving the recovery from these formations, in which permeability is usually less than 0.1 mD and pore sizes in rock formations are mostly less than 100 nm in diameter. However, the complex fluid flow and phase behavior of these formations make them more challenging in many operational aspects including finding the most economic and efficient EOR technique. Common EOR practices that have been tested in shale and tight formations include natural gas/$CO_2$ cyclic injection and surfactant injection. These studies show that the efficiency of natural gas/$CO_2$ cyclic injection is dictated by achieving a desired miscibility condition which is sensitively controlled by an existing fracture density within a rock formation. Other influential factors on the efficiency of natural gas/$CO_2$ cyclic injection include: the ability of a formation to safely contain a high pressure injected gas near a wellbore, contact of the wellbore with maximum volume of a productive zone within the formation, and the appropriate well spacing to minimize hydraulic commination between wells.

These complications resulted in a need for alternative methods such as the application of aqueous solutions like surfactants. Solvent injection is a well-established method to improve hydrocarbon recovery from conventional reservoirs, however, fundamental aspects of the transport of the injected solvent in tight reservoirs are yet to be investigated. Continuous solvent/surfactant flooding is impractical in unconventional reservoirs since sweep efficiencies are very low and the injected solvent cannot mobilize oil out of the matrix from one well to another (except through high-permeability conduits such as a fracture, if present). Therefore, a cyclic approach like a huff n' puff is needed where sweep efficiencies are low. In the "huff" phase, solvent is injected into a reservoir where the solvent travels through a fracture network. Following this period, an injection well is shut-in to allow the solvent to penetrate rock by spontaneous imbibition into a matrix and replace reservoir oil during a "soak" interval. After enough soaking time, the injection well—along with any potentially impacted wells nearby—is re-opened at a low pressure to produce an expelled oil phase and a solvent-rich phase. Although the injected fluid is usually referred to as "gas", the injected fluid is also a solvent—a mix of a carrier fluid (water, gas, or liquid) and surfactant.

Surfactants, or molecules that adhere to interfaces (e.g., water-oil, liquid-gas, and solid-liquid or -gas) and lower their surface energy, are normally derived from crude oil processed products (e.g., petroleum sulphonates). This means that despite their success in stripping out residual oil from unconventional formations, surfactants cost much more than the market value of the oil recovered in this way. The surface activity of surfactants is enabled by their molecular structure, consisting of separated hydrophilic and lipophilic domains. Surfactants are categorized by their chemistry, in particular by their polar moiety, or "head group" being cationic, anionic, amphoteric, or nonionic.

A significant drawback of surfactant assisted EOR techniques using fossil fuel-derived surfactants is the adsorption of surfactant material onto the reservoir rock. This reduces the surfactant performance over time and leaves permanent negative impacts on rock formations and water. Surfactant instability and dissociation at various reservoir temperatures and salinities is another issue that may cause permanent damage to the reservoir. Generally, the cost of the surfactant is the single most expensive item in the cost of a chemical EOR. These costs include both the initial investment in purchasing the surfactant as well as the cost of replacing surfactant that has been lost due to adsorption.

Surfactants can also be biobased, produced directly by microorganisms that typically consist of lipid, protein, and/or carbohydrate moieties and are frequently associated with cell walls or membranes. Enzymes play an important role in the manufacture of many biobased surfactants. Replacement of chemical surfactants with biobased surfactants such as enzymatic green solvents that can change the wettability of formation rocks and fluid systems by changing the interfacial tension, has been investigated. These solvents are mostly aqueous, and their hydrogen bonding makes them very diffusible in the water phase. Enzymes—in whole or in part—are derived from biological products and are globular proteins that are eco-friendly. This minimizes any adverse long-term impact on rock and water in formations. The use of enzymes provides many advantages compared with chemical processing, including lower energy use, lower amounts of waste products and by-products, the absence of toxic metal catalysts or acids/bases, and safer operating conditions. In combination with other additives, enzymes can change adhesion behavior of an oil-water-rock system by pushing away hydrocarbons from rock surfaces, allowing hydrocarbons to flow.

There is a continuing need for improved substances and techniques for recovering subsurface fluids from rock formations. This invention includes utilizing a preferred choice of enzymes and additives of a green solvent blend, such as alcohol dehydrogenase, α-Amylase, glucosidase, glucosyl transferases, lipase, papain (and lipase), phospholipases, glycolipids, lipopeptides, flavolipids, phospholipids, fatty acid esters, and high-molecular-weight polymers such as lipoproteins, lipopolysaccharide-protein complexes, and/or polysaccharide-protein-fatty acid complexes as well as appropriate field execution strategies for recovering fluids from unconventional formations.

SUMMARY OF THE INVENTION

The invention generally relates to providing an improved hydrocarbon recovery. The general object of the invention can be attained, at least in part, through utilizing an aqueous and/or non-aqueous enzyme-based green solvent that is applicable for improving the recovery of hydrocarbons from reservoir rock in unconventional resources. The invention seeks to optimize the formulation of the solvent in terms of concentration of components with sensitivity to environmental conditions.

In the case of unconventional reservoirs, developing technologies to increase production from individual reservoirs can be complex, often involving extensive trial and error to determine an effective blend of EOR solution. Such trial and error can be time consuming and expensive unless injection fluid tuning is provided. Depending on the surface characteristics of the rock, environmental condition such as temperature, pressure, salinity and PH, and properties of the oil in place in the reservoir, molecular structure of biobased surfactant leads to different adsorption behavior of surfactant and thereby causes different wettability alteration.

A proper enzyme-based green solvent has the potential to alter rock surface wettability and consequently improve oil recovery in shale reservoirs. In one embodiment of the invention, an enzyme-based green solvent can be tuned by accessing both surface properties of rock and chemical composition of oil found in a reservoir. An ion effect on wettability of a contact surface of the rock can be acquired and then used to formulate a tuned enzyme-based green solvent.

The purpose of this invention is to formulate an improved subsurface fluid recovery system by means of injecting an enzyme-based green solvent stream to a reservoir using a well as a flow path. This invention also aims to optimize the formulation of such solvents in terms of type and/or concentration of components and sensitivity to the reservoir rock and environmental conditions. Such environmental conditions may include, but are not limited to, pressure, temperature, PH, and salinity for efficient use in a well.

The invention includes a method for recovering subsurface fluid from rock formations by adding an enzyme-based green solvent to a carrier fluid, injecting the enzyme-based green solvent and the carrier fluid into a well, and directing the enzyme-based green solvent and the carrier fluid down a flow path of the well. The method also includes soaking the enzyme-based green solvent and the carrier fluid in the well before reversing the flow path of the well (and/or opening the flow from an adjacent well) so that the enzyme-based green solvent and the carrier fluid can contact farther parts of the rock formation around a wellbore. A plurality of deposits is then recovered from the same well used for injection and other neighboring wells impacted by the enzyme-based green solvent.

In certain embodiments, the enzyme-based green solvent is paired with a slurry. The slurry includes nanoparticles. In embodiments of the invention, the slurry includes magnetic nanoparticles. The slurry may also include proppant. The slurry nanoparticles can encapsulate enzymes to control the release of enzymes in targeted regions of the reservoir. Release of enzymes in targeted regions can be controlled by triggering dissolution of the encapsulation through PH or temperature control. The method then includes guiding the magnetic nanoparticles to a desired part of the formation using a magnetic field. Magnetic nanoparticles and proppants have a core-shell structure in which the core contains a superparamagnetic nanomaterial with a sufficient effective magnetic susceptibility contrast such as iron-oxide. The enzyme-based green solvent is encapsulated in the core and then released from the nanoparticles once the solvent is settled in desired parts of the formation. Embodiments of the invention include monitoring a magnetic response from the nanoparticles. The magnetic response models an arrangement of fractures at different parts of the flow path. In certain embodiments, the enzyme-based green solvent is paired with a slurry. The slurry includes tracers. Embodiments of the invention include monitoring the movement and settlement of the nanoparticles and enzyme-based green solvent using radioactive, chemical, or other kinds of tracers.

Embodiments of the invention include a heating tool in the well for controlling a temperature of the slurry containing the enzyme-based green solvent. In certain embodiments, enzymes are immobilized in the core of the nanoparticles. The enzymes are released by dissolving the core-shell structure of the nanoparticles under certain temperatures. The invention also includes deploying a subsurface heating or cooling tool in the well (or an adjacent well) for controlling the temperature and release of the enzyme-based green solvent.

The subject invention also provides a method for recovering subsurface fluid from rock formations by directing a liquid down a flow path of a well, soaking the liquid in a formation and recovering the liquid from the well including the subsurface fluids such as oil, gas, and water. The method includes adding a nanoparticle slurry to the liquid and coating each nanoparticle of the nanoparticle slurry with an immobilized enzyme-based mixture. The immobilized enzyme-based mixture includes an enzyme-based green solvent. A magnetic field is applied in a sub-surface nearby the well to interact with nanoparticles of the nanoparticle slurry and to guide enzyme-coated nanoparticles through the formation via the magnetic field.

The method is performed during at least one of a primary recovery, an initial fracturing, a secondary recovery, a refracturing, a frac-hit mitigation, or a huff n' puff. The enzyme-based green solvent preferably has an enzyme concentration less than the critical micelle concentration (CMC). The solvent is desirably aqueous including more than about 90% water. In embodiments of the invention, the solvent is also desirably non-aqueous including a carrier fluid. The carrier fluid includes at least one of a hydrocarbon liquid, a compressed gas, or a foam.

The invention includes a subsurface fluid recovery mixture for use with at least one well. The subsurface fluid recovery mixture includes a slurry to flow down a flow path of a well. In certain embodiments, the slurry includes a plurality of nanoparticles and an enzyme-based green solvent. The slurry has a desired pressure, temperature, pH and salinity.

Other objects and advantages will be apparent to those skilled in the art from the following detailed description taken in conjunction with the appended claims and drawings.

DETAILED DESCRIPTION OF THE INVENTION

The present invention relates to a specific type of subsurface fluid recovery and formation treatment that is aided by the application of aqueous and/or non-aqueous enzyme-based green solvents. This is achieved with a recovery system including at least one well and an injection pump system to inject an enzyme-based green solvent along with a chosen carrier fluid downhole to a rock formation. The solvent can be aqueous comprising mostly water, or non-aqueous containing hydrocarbon liquid, compressed gas, foam, $CO_2$ or other suitable substances as a carrier fluid. Principals of manufacturing a green solvent include efficient utilization of raw materials (preferably renewable) as feedstocks for a product and energy source, and elimination of toxic materials (including solvents) in the manufacture (preparation and purification) and utilization of the product. The main role of the enzyme in the solvent is the enzyme's covalent attachment of a hydrophile and a lipophile.

Enzyme-based solvents may be formulated as a formation-specific solution by adapting the molecular structure of the "head group" to be cationic, anionic, amphoteric, or nonionic. Such a formulations can be based on the formation rock and reservoir fluid characteristics (such as mineralogy, wettability, in-situ microorganisms, native water/hydrocarbon compositions, etc.) or as a general-purpose formulation by adapting a hydrophilic-lipophilic balance that allows for dissolving oil into water (making the solvent more hydrophilic). Such a formulation works for the majority of unconventional formations. Enzymes used in the claimed invention include commercial mixtures that include a class of DNA-modified proteins found in living organisms. The enzymes themselves are non-living. These enzymes are water soluble, making the enzymes very diffusible in a water phase due at least in part to hydrogen bonding. While enzyme-based solvents, particularly enzyme-based green solvents, are generally described in this invention, it is to be understood that any number of enzyme-based green solvents could be used in accordance with the invention described herein.

The present invention is described in further detail in connection with the following examples which illustrate or simulate various aspects involved in the practice of the invention. It is to be understood that all changes that come within the spirit of the invention are desired to be protected and thus the invention is not to be construed as limited by these examples.

Figure 1:
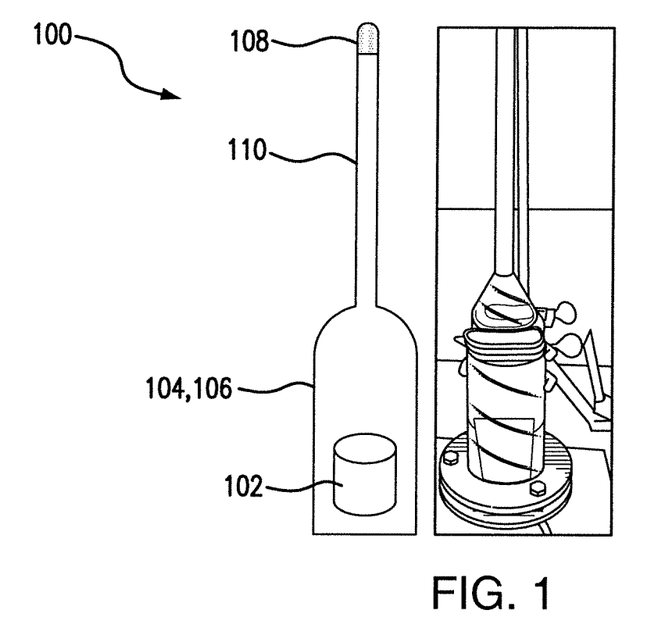
FIG. 1 shows a schematic view of an Amott cell for laboratory imbibition testing known in the art.

FIG. 1 shows an Amott cell containing a crude oil saturated core plug inside an aqueous phase. Amott cells are widely used for spontaneous imbibition tests to determine absorption of one substance by another. Amott cells tests work based on a combination of forced and natural displacement processes of a non-wetting fluid from a saturated rock sample using a wetting fluid by capillary forces. Other objects and advantages of using Amott cells to determine subsurface fluid recovery will be understood to those of ordinary skill in the art. The Amott cell of FIG. 1 includes an apparatus 100 for determining oil recovery. A rock sample 102 including a saturated core plug with crude oil is submerged in an aqueous phase 104 inside the apparatus 100. The aqueous phase 104 includes an enzyme-based green solvent 106. The enzyme-based green solvent 106 displaces crude oil 108 from the rock sample 102. The crude oil 108 is collected in a collection tube 110 of the apparatus 100 where the amount of collected crude oil is measured. The rock samples used in this invention include samples with a wide variety of properties.

Tables 1 and 2 detail properties and mineralogy of various core rock samples. While Tables 1 and 2 show details of sandstone and shale cores used as rock samples for oil recovery with an Amott cell, it is to be understood that any other rock or similar samples may be used with this invention to recover oil from said samples.

TABLE 1

Core Sample Properties

| Sample ID | Diameter cm | Length cm | Dry Mass, g | Porosity, % | Saturated Weight, g | Volume, CC | Saturation % |
|---|---|---|---|---|---|---|---|
| Sandstone | | | | | | | |
| 1 | 2.54 | 5.58 | 60.17 | 18.33 | 64.65 | 28.29 | 96 |
| 2 | 2.54 | 5.59 | 60.58 | 17.90 | 64.95 | 28.33 | 96 |
| Shale | | | | | | | |
| 2 | 2.54 | 2.84 | 30.17 | 12.74 | 31.62 | 14.39 | 88 |
| 3 | 2.54 | 2.11 | 23.5377 | 9.56 | 34.62 | 10.69 | 90 |
| 4 | 2.54 | 2.95 | 31.6161 | 11.82 | 33.6 | 14.95 | 92 |
| 5 | 2.54 | 3.08 | 33.12 | 12.06 | 34.62 | 15.61 | 88 |
| 6 | 2.54 | 2.95 | 32.14 | 11.99 | 33.60 | 14.95 | 90 |
| 9 | 2.54 | 3.12 | 33.70 | 12.25 | 35.29 | 15.81 | 91 |
| 10 | 2.54 | 2.29 | 24.53 | 13.00 | 25.77 | 1160 | 91 |

Table 2 shows mineralogy of the samples from Fourier-transform infrared spectroscopy (FTIR).

TABLE 2

Core Samples Mineralogy from FTIR

| Sample ID | | 3 | 3 | 4 | 5 | | 1 |
|---|---|---|---|---|---|---|---|
| Quartz | Shale | 28 | 22 | 35 | 24 | Sandstone | 74 |
| Calcite | | 0 | 0 | 0 | 0 | | 1 |
| Dolomite | | 32 | 40 | 16 | 38 | | 4 |
| Illite | | 0 | 10 | 5 | 0 | | 0 |
| Smectite | | 0 | 0 | 0 | 0 | | 0 |
| Kaolinite | | 2 | 2 | 3 | 2 | | 3 |
| Chlorite | | 1 | 2 | 6 | 2 | | 0 |
| Pyrite | | 0 | 0 | 0 | 0 | | 0 |
| Orthoclase | | 6 | 3 | 6 | 6 | | 0 |
| Oglioclase | | 7 | 1 | 6 | 0 | | 4 |
| Mixed Clays | | 25 | 14 | 20 | 22 | | 15 |
| Albite | | 0 | 0 | 0 | 0 | | 0 |
| Anhydrite | | 1 | 0 | 2 | 0 | | 0 |
| Sidelite | | 9 | 4 | 5 | 5 | | 0 |
| Apatite | | 0 | 0 | 0 | 0 | | 0 |
| Aragnite | | 1 | 0 | 1 | 0 | | 0 |

For the samples in Tables 1 and 2, Berea sandstone cores and Woodford shale outcrop cores with 2 inches length and 1-inch diameter were cut, dried, and then saturated with crude oil, although other core sizes and oils may be used. In this example, sandstone saturation was conducted using crude injection after a period of 4-hours vacuuming while shale saturation was conducted using 72-hours pressurized injection of crude under 1500 psi after a period of 24-hours of vacuuming. Berea sandstone cores had an aging of 15 days and the Woodford shale samples had an aging of 17 days.

Spontaneous imbibition tests conducted on the samples identified in Tables 1 and 2, using the apparatus 100 of FIG. 1, results in calculations of displaced crude oil from each of the rock samples over time. To show the effectiveness of utilizing an enzyme-based green solvent in the aqueous phase of the apparatus 100, an alternative wetting fluid, such as water is also used.

Figure 2:
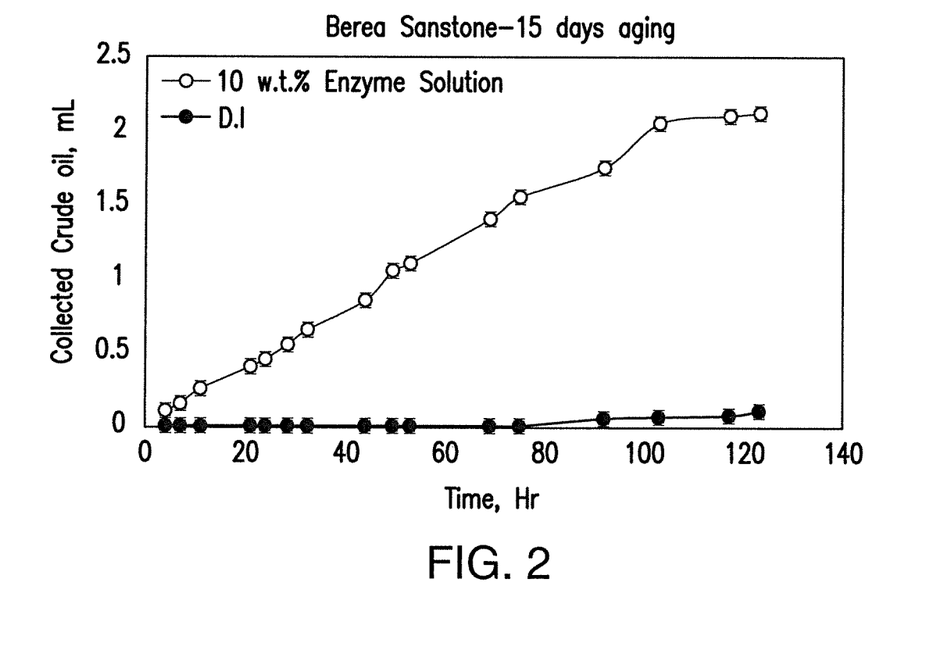
FIG. 2 shows a line graph of recovered subsurface fluids with an enzyme-based green solvent according to one embodiment of this invention.
Figure 3:
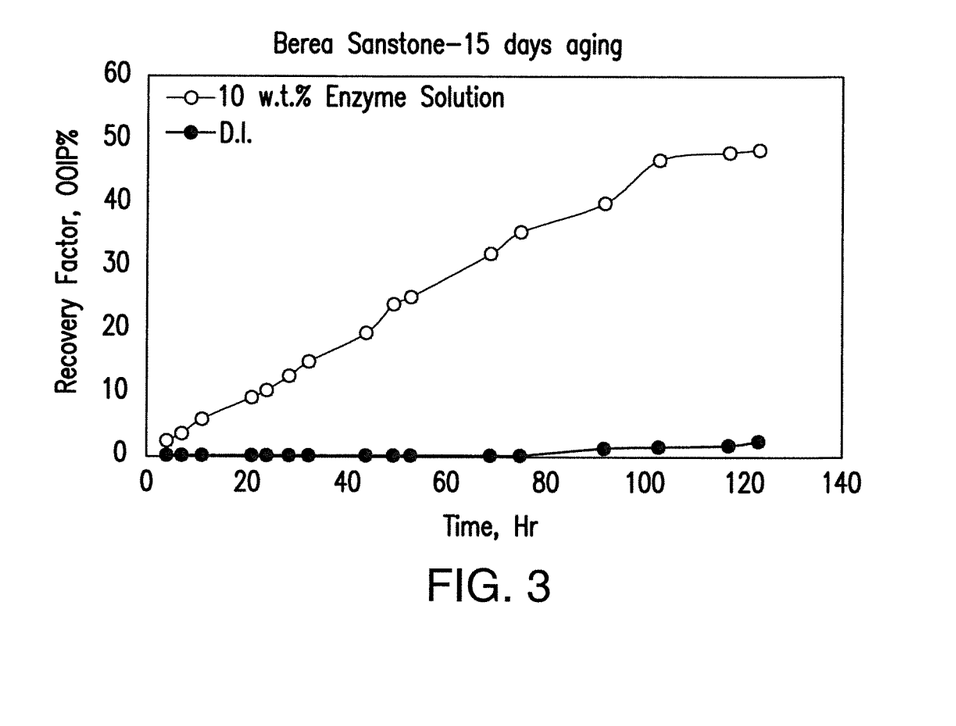
FIG. 3 shows a line graph of recovered subsurface fluids with an enzyme-based green solvent according to the embodiment of FIG. 2.

FIG. 2 shows the amount of recovered oil (in mL) from Berea sandstone after 15 days of aging. In this example, a solution of 10 w.t. % enzyme was used and compared to a solution of deionized (DI) water. FIG. 3 shows the amount of recovered oil from the example of FIG. 2 measured according to original oil in place (OOIP) %. Overall, the crude oil recovery with a 10% enzyme solution is 53%, compared to a mere 2% when using DI water.

Figure 4:
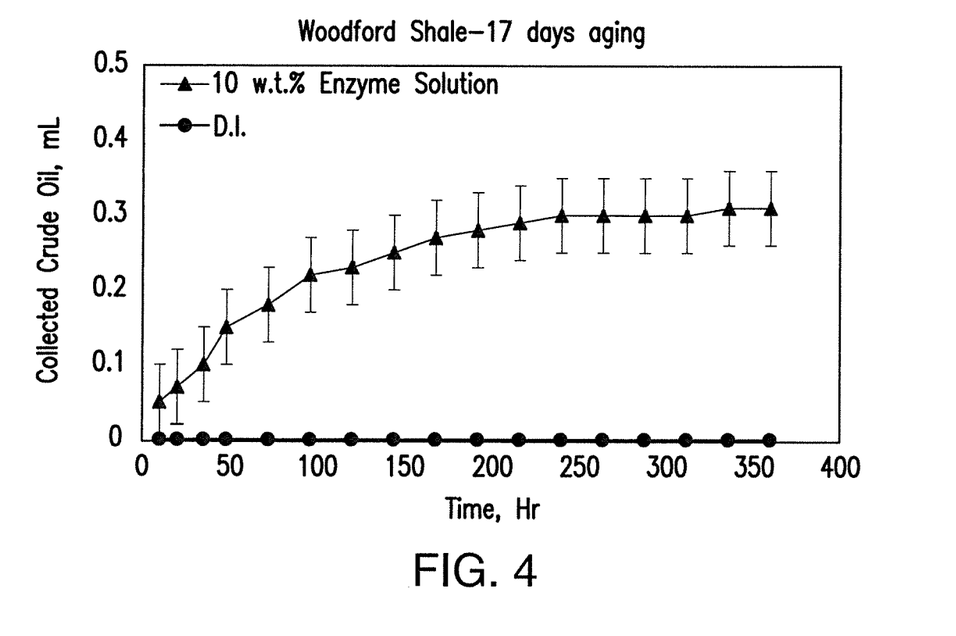
FIG. 4 shows a line graph of recovered subsurface fluids with an enzyme-based green solvent according to one embodiment of this invention.
Figure 5:
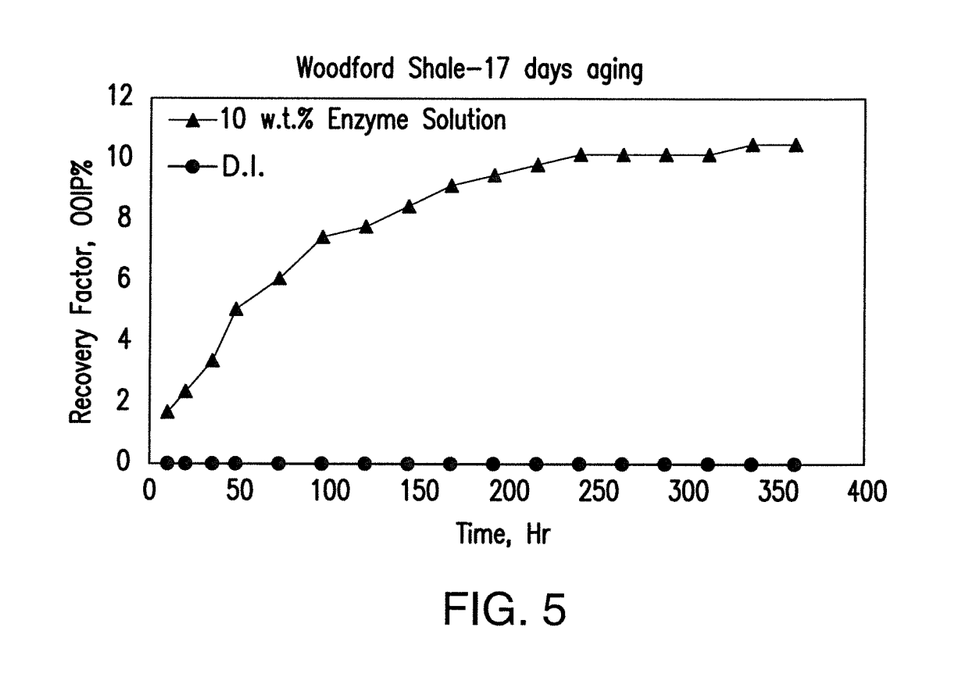
FIG. 5 shows a line graph of recovered subsurface fluids with an enzyme-based green solvent according the embodiment of FIG. 4.

FIG. 4 shows the amount of recovered oil (in mL) from Woodford shale after 17 days of aging. Imbibition rates in shale samples are relatively low, and the Amott cell apparatus is maintained under a constant ambient temperature condition. In this example, a solution of 10 w.t. % enzyme was used and compared to a solution of DI water. FIG. 5 shows the amount of recovered oil from the example of FIG. 4 measured according to OOIP %. Overall, the crude oil recover with a 10% enzyme solution is 11%, compared to 0% when using DI water.

To facilitate additional examples, surface tension measurements for different enzyme concentrations at room temperature are calculated. Surface tension for a 10% enzyme solution is 48.4 mN/m. Surface tension for a 5% enzyme solution is 51.5 mN/m. As such, additional examples using an enzyme-based green solvent to recover oil includes modifying enzyme concentration.

Figure 6:
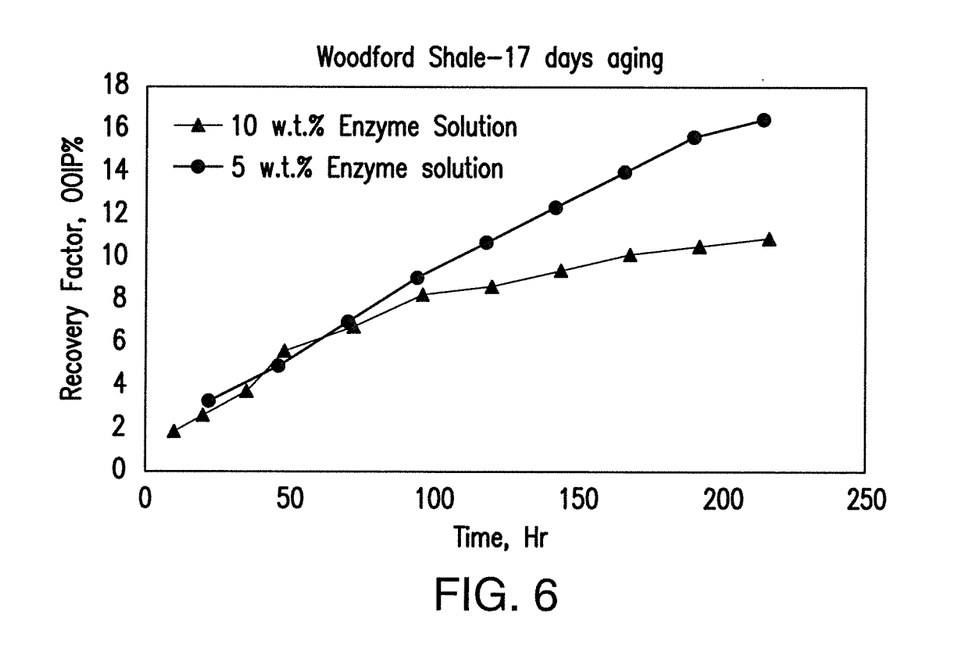
FIG. 6 shows a line graph of recovered subsurface fluids with an enzyme-based green solvent according to one embodiment of this invention.

FIG. 6 shows the amount of recovered oil (in OOIP %) from Woodford shale using solutions of 10 w.t. % enzyme, and using solutions of 5 w.t. % enzyme for a period of 17 days. As also was shown in FIG. 5, the 10% enzyme solution yields a crude oil recovery of 11%. The 5% enzyme solution yields a much higher recovery, outperforming the 10% enzyme solution. The critical micelle concentration (CMC) of the enzyme-based green solvent of the test solvent is, therefore, preferably between 5% and 10%. While the enzyme concentrations in this embodiment include 10% and 5%, it is to be understood that other various percentages/concentrations may be used to successfully collect crude oil.

Figure 7:
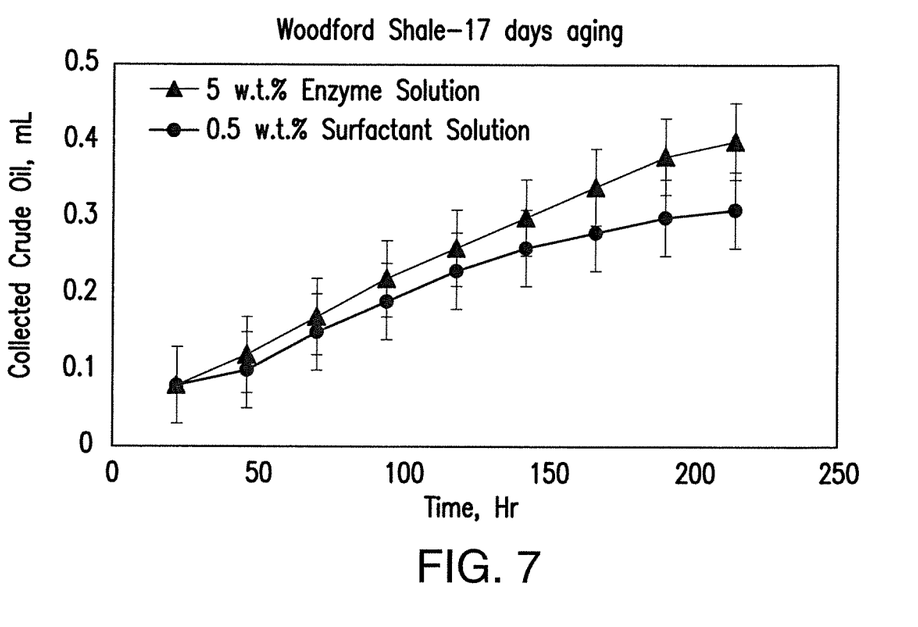
FIG. 7 shows a line graph of recovered subsurface fluids with an enzyme-based green solvent according to one embodiment of this invention.
Figure 8:
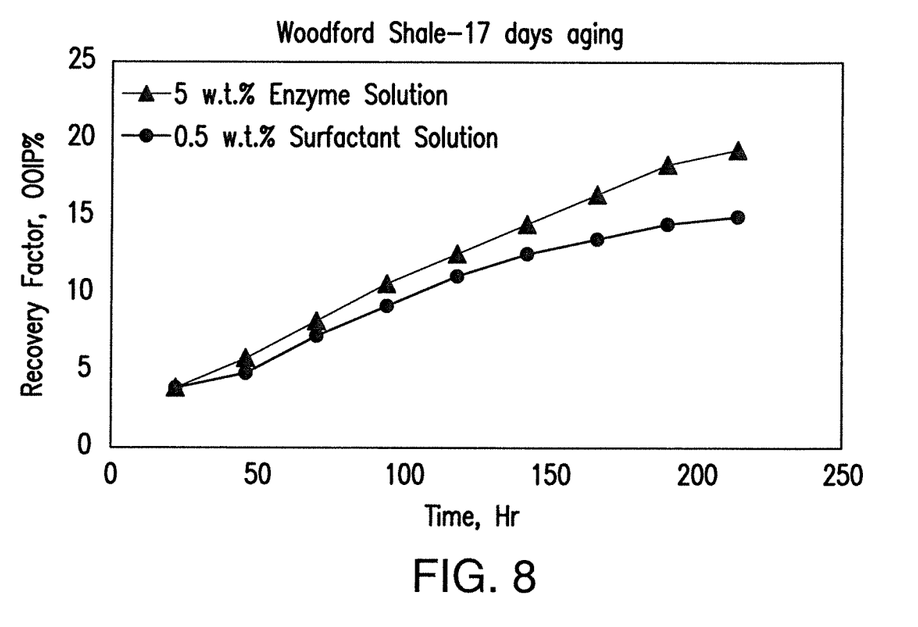
FIG. 8 shows a line graph of recovered subsurface fluids with an enzyme-based green solvent according to the embodiment of FIG. 7.

FIG. 7 shows the amount of recovered oil (in mL) from Woodford shale using the preferred 5 w.t. % enzyme compared to a solution of 0.5 w.t. % surfactant. The surfactant is preferably a non-ionic surfactant that is a secondary ethoxylated alcohol with a surface tension of 31 mN/m at the 0.5 w.t. % used, although other surfactants may also be used for comparison. Persons of ordinary skill in the art will understand that most eligible surfactants at a concentration of 0.5% yield a surface tension around 30 mN/m. FIG. 8 shows the amount of recovered oil from the example of FIG. 7 measured according to OOIP %. As shown, the 5% enzyme solution recovers more oil than the 0.5% surfactant.

Figure 9:
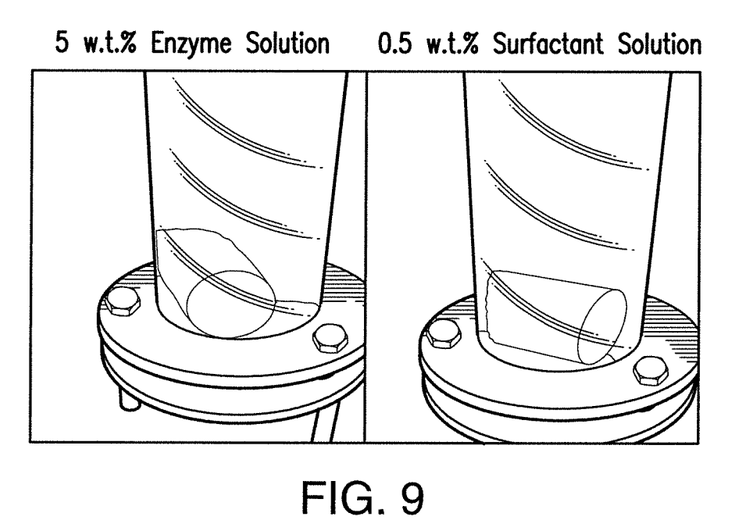
FIG. 9 shows an Amott cell for recovering subsurface fluids with an enzyme-based green solvent and a surfactant according to one embodiment of this invention.
Figure 10:
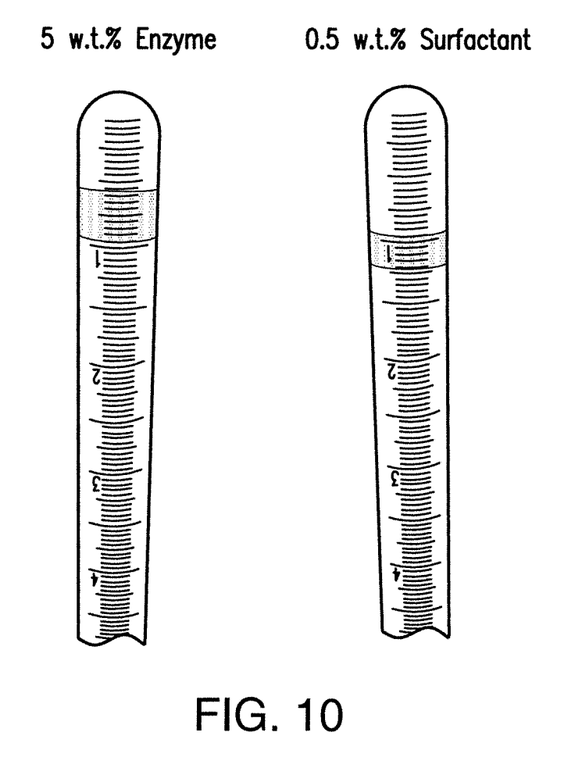
FIG. 10 shows an Amott cell for recovering subsurface fluids according to the embodiment of FIG. 9.

FIG. 9 shows the comparison of the rock samples used in Amott cells from FIGS. 7-8. Comparing the sample treated with a 5% enzyme solution with the 0.5% surfactant solution, it is evident that more oil has been expelled from the enzyme solution sample. FIG. 10 shows the amount of oil recovered from the cells of FIG. 9. Each collection tube shows the collected oil recovered from Woodford shale after 214 hours. As shown, the 5% enzyme solution recovered more oil than the 0.5% surfactant.

Based on the illustrated examples, this invention preferably utilizes an enzyme-based green solvent solution between 5-10 w.t. %, desirably 5 w.t. %, of enzyme to recover subsurface fluids from rock formations, although it is to be understood that any number of additional enzyme concentrations may be used.

Figure 11:
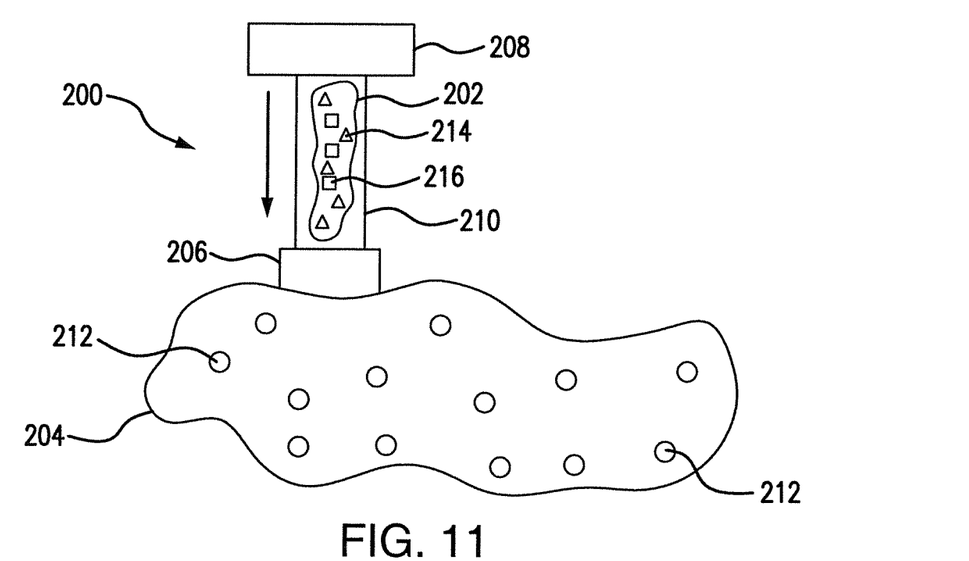
FIG. 11 shows a production well apparatus for recovering deposits from a rock formation according to one embodiment of this invention.

FIG. 11 shows a production well 200 according to one embodiment of this invention. The production well 200 includes a carrier fluid 202 that is injected into a rock formation 204 through a down hole 206 of the well 200. A storage component 208 releases the carrier fluid 202 down a flow path 210, through the down hole 206 and into the rock formation 204. The rock formation 204 contains a plurality of deposits 212. The plurality of deposits 212 preferably include crude oil, although it is to be understood that the rock formation may be any type of rock formation and therefore contain any number or types of deposits.

The carrier fluid 202 includes an enzyme-based green solvent 214 and a slurry of nanoparticles 216. The enzyme-based green solvent 214 and the nanoparticles 216 are injected into the rock formation 204 with the carrier fluid 202. Once inside the rock formation 204, the carrier fluid 202 contacts the deposits 212.

With the aid of the enzyme-based green solvent 214 and the nanoparticles 216, the well 200 facilitates hydrocarbon recovery from the deposits 212. In particular, hydrocarbons can be recovered from unconventional and fractured rock formations with the enzyme-based green solvent. The enzyme-based green solvent 214 is transported to the rock formation 204, using the carrier fluid 202, through fracture networks in the rock. This provides the enzyme-based green solvent 214 with an exposure to a rock matrix during a soak-time. The soak-time occurs for a designated period of time depending on a variety of factors including, but not limited to, the type of rock formation, the type of enzyme, the injected volume, the type of deposits being recovered, etc.

Exposing the enzyme-based green solvent 214 to the rock matrix provides an uplift of additional fluid recovery from the deposits 212 as compared to the prior art. This additional recovery can be accomplished at least in part by displacing some of the fluid within the matrix through wettability alteration and spontaneous imbibition. Wettability and interfacial tension alterations can lead to imbibition of a non-wetting fluid. The non-wetting fluid is desirably a stream of the enzyme-based solvent 214, going into matrix pores of the rock formation 204 and, consequently, leading to a release of the wetting phase. The wetting phase is preferably the target subsurface fluid needed to be produced from the deposits 212 (e.g., oil).

As shown in FIG. 11, the enzyme-based green solvent 214 is paired with the nanoparticles 216 in the carrier fluid 202. The nanoparticles 216 can improve the distribution of the solvent 214 in a plurality of narrow pores in a formation matrix of the rock formation 204. In embodiments of the invention, enzymes from the enzyme-based green solvent 214 can be modified and immobilized on surfaces of the nanoparticles 216 as a coating layer.

Figure 12:
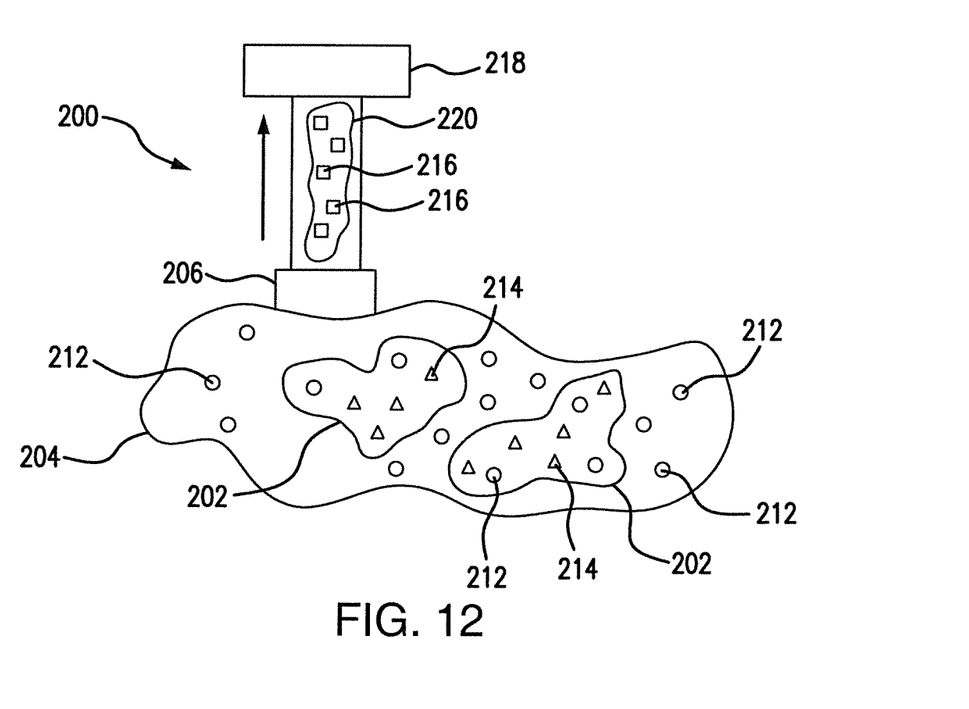
FIG. 12 shows the production well apparatus for recovering deposits from a rock formation according to the embodiment of FIG. 11.

FIG. 12 shows the enzyme-based green solvent 214 released from the nanoparticles 216 into the rock formation 204. The nanoparticles 216 can be targeted to a specific depth of the rock formation 204. Once at the depth, the nanoparticles 216 release the immobilized solvent 214 into the rock matrix at the specific depth. Embodiments of this invention may also include the use of proppants in a slurry as opposed to nanoparticles. It is to be understood that other relative carriers may be used as well.

In embodiments of the invention, the nanoparticles may be magnetic. Magnetic nanoparticles 216 get delivered to and from the rock formation 204 by a magnetic drive 218 to deliver the enzyme-based green solvent 214 to matrices of the rock formation 204. Bodies of the magnetic nanoparticles 216 can encapsulate a layer of selected enzymes that get delivered to the matrix through the magnetic drive 218. The magnetic drive 218 controls the motion of the nanoparticles 216 by applying a sub-surface magnetic field so that the nanoparticles 216 are guided to disperse through tight reservoirs of rock. The magnetic drive 218 also controls the removal of the nanoparticles 216 from the rock formation 204 after the enzyme-based green solvent 214 coating is removed form the nanoparticles 216. The magnetic drive 218 retracts the nanoparticles 216 in a slurry 220 by reversing the flow path up through the down hole 206 of the production well 200. The enzyme-based green solvent 214 in the carrier fluid 202 is left in the rock formation 204 to further soak before collecting deposits 212.

Figure 13:
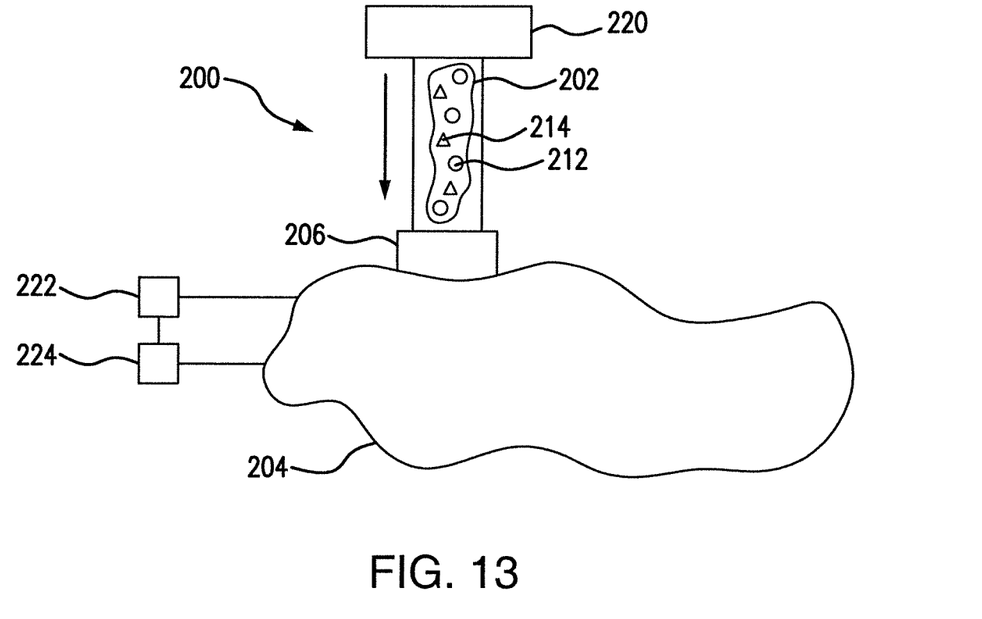
FIG. 13 shows the production well apparatus for recovering deposits from a rock formation according to the embodiment of FIG. 11.

FIG. 13 shows the plurality of deposits 212 collected from the rock formation 204. After a soaking period, the carrier fluid 202 along with the enzyme-based green solvent 214, travels back up the flow path with collected deposits 212 to a collection chamber 220. It is to be understood that the enzyme-based green solvent 214 can also be delivered to the formation 204 without the additional of the nanoparticles and/or proppant slurry. In embodiments of the invention, an injection stream may include only the enzyme-based green solvent and the carrier fluid. Suitable enzyme-based green solvent concentrations may be calculated or estimated on the basis of the underground rock formation, its organic and mineral composition, the type of enzymes, the composition of the subsurface deposits, and other relevant factors. Application of an aqueous enzyme-based green solvent for subsurface recovery improvement, makes it possible to recover and reuse the enzymes injected into the well. The recovered enzyme-based stream can be reused on-site for other oil-removal or rock-cleaning purposes including core, sand, proppant, or recovered mud cleaning.

This invention facilitates the delivery of the enzyme-based green solvent to desired parts of the formation through the application of enzyme-bearing nanoparticles, particularly magnetic nanoparticles. Guided dispersion of the enzyme-based green solvent in the reservoir is possible by applying a magnetic field around an injection path of the magnetic nanoparticle slurry using a magnetic field generator. The use of magnetic nanoparticles can also identify the porous media and/or fracture network characterizations of rock formations by monitoring magnetic responses of the nanoparticles. This invention facilitates not only the delivery of the wettability-alternating and recovery-improving enzyme-based green solvent to the matrix through existing flow paths and fractures in the rock, but also the guided dispersion of the nanoparticles/proppants. Thus, surface monitoring of the magnetic responses of the dispersed nanoparticles/proppants can be collected with a magnetic data acquisition tool and used for real-time modeling of rock formations.

A further advantage of the subject invention is that the enzyme-based green solvent provides additional well-cleaning and treatment to permeability impairment of near wellbore regions and existing fractures. Enzymes that are genetically modified from a specific class of microorganisms that remove metal from soil, can be used in the aqueous or non-aqueous enzyme-based green solvent to treat waste/flowback water for heavy metal extraction purposes.

This invention is further related to application of aggregation-assistant enzymes in the enzyme-based green solvent and subsequent slurry for the purpose of plugging and/or unplugging certain parts of the rock formations and fracture network by controlling the temperature of the slurry to activate or deteriorate enzyme activities. Therefore, as shown in FIG. 13, embodiments of the invention may also include temperature controls 222, 224. Heating tool 222 may increase the temperature of the enzyme-based green solvent, while cooling tool 224 may decrease the temperature of the enzyme-based green solvent. Modifying enzyme temperature may be desired as certain classes of enzymes are known to improve aggregation of solid particles. Such enzymes, for example, have been used for concrete cement production. These enzymes will often only have a certain temperature range at which they are operative and will deteriorate or be destroyed outside this temperature range. Integrating temperature control by using the heating and/or cooling tools 222, 224 downhole close to the enzyme-bearing particles or calculating the zonal temperature based on geological and/or geographical input, aids the subject invention to control activation of enzymes that cause particle aggregation and control perforation plugging/unplugging.

The collected deposits 212 can be recovered from the production well 200 via the enzyme-based green solvent 214 at optimum temperature during a wide variety of common processes utilizing the production well 200. Such processes include, but are not limited to, primary recovery, initial fracturing, secondary recover, re-fracturing, and huff n' puff processes.

Primary Fracturing/Refracturing

Embodiments of this invention may be applied as a part of a primary fracturing or refracturing work on a well. The addition of enzyme-based green solvents to a fracturing fluid provides an uplift to primary post-fracturing production by allowing enzyme-based surface activating agents to contact a rock formation during the primary fracturing time. Thus, the application of an enzyme-based solvent during initial hydraulic fracturing or re-fracturing facilitates significant injection flow of a relatively low enzyme concentration (preferably 5%) to achieve an efficient and cost-effective additional recovery of deposits while the enzymes are effectively distributed within the rock formation in suitable concentrations.

Fracture-Hit Mitigation

Embodiments of this invention may be applied as a part of Fracture-hit mitigation or managing parent-child well interactions. Well-to-well communication, known as "frac-hits" during hydraulic fracturing, is common in unconventional oil and gas development. When the fracture network of a newly drilled well connects to an older well's fracture network, the older well may be filled with sand and fluids, requiring an expensive cleanout to restore production. To help mitigate frac-hits, the enzyme-based green solvent can be used, with or without the slurry of nanoparticles, to repressurize the older well and improve the recovery of additional oil.

"Huff n' Puff"

Embodiments of this invention may include a high-volume continuous injection stream of a carrier fluid combined with a relatively low concentration of enzyme-based solvent injected into a rock formation followed by a soaking period. The soaking period may be modified according to rock-fluid system characteristics in a reservoir. Then, by reversing the flow (flow-back) of the injection stream, a well can get back recovery of deposits during the flow-back. This "huff n' puff" technique allows use of the same well for both production and injection and eliminates high sweep efficiency requirements.

Secondary/Tertiary Recovery

Embodiments of this invention can also be applied as part of secondary or tertiary subsurface fluid recovery. This applies to enhanced/improved oil recovery (EOR/IOR) from unconventional rock formations. EOR/IOR relates to different techniques with the aim of recovering remaining hydrocarbon deposits from oil in a rock formation, after an initial production period. A major problem of oil recovery from unconventional formation, in general, is that a significant part of the oil remains in underground strata of the rock when applying conventional methods such as water, gas, polymer, surfactant flooding or cyclic gas injection to keep the pressure high in the reservoir. Conventionally applied techniques vary considerably in complexity, depending on many different factors including type of oil, the structure and the type of the underground formation, amount of oil accessible from the hydraulically fractured wells, etc.

Enzyme-assisted enhanced oil recovery for secondary or tertiary subsurface fluid recovery according to this invention can be achieved by using an oil recovery system that includes at least one well and one injection pump system. Where the enzyme-based green solvent is aqueous, the solvent may rely on an existing well and surface infrastructure of the well to reduce the need for significant transformation of well-site facilities and associated expenses. A high-volume continuous water injection stream combined with a relatively low concentration of enzyme-based green solvent may be injected to the formation through a well, followed by a soaking period in the reservoir (the "huff"). Then, by reversing the flow, the well gets back to the recovery of oil deposits during a flow-back period ("puff").

Where sweep efficiencies are achievable between the wells, enzyme-based green solvent may be injected to the formation through one well and produced from a neighboring well. Where inter-wall communication exists due to the presence of fractures, multiple wells get impacted by the injection of the enzyme-based green solvent in one well. Therefore, multiple impacted wells are shut-in during the soak time and can re-open after sufficient soak time, altogether or one by one, to recover additional oil from each well. Should water injection or water presence be an issue, the technique can be coupled with non-aqueous fluids such as oil/natural gas/$CO_2$ by modifying enzymes in a non-aqueous solvent. Additionally, compatible foaming agents can be added to the enzyme-based stream to provide a synergy between the gas mobility and enzyme impact on oil deposits in formations.

As used herein, references to subsurface fluid systems are to be understood to refer to systems consisting of oil, gas, and water trapped in underground reservoir rock. Further, references herein to unconventional formation are to be understood to refer to formations where average pore sizes are about 2 to 0.03 μm in diameter, exhibiting ultralow permeabilities; such as tight sands/carbonates and shale formations. Primary recovery as used herein is to be understood to refer to the amount of subsurface fluid recovered from formations upon opening drilled wells to flow for the first time, after fracturing, re-fracturing, or frac-hit mitigation. Lastly, secondary recovery as used herein is to be understood to refer to any attempt for recovering additional fluids from the formation once the primary recovery is no longer economic.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. A method for recovering subsurface fluid from rock formations, the method comprising the steps of:
providing a carrier fluid including an enzyme-based green solvent that is paired with a slurry of nanoparticles having size of between 1 to 500 nanometers, wherein the enzyme-based green solvent is immobilized on the nanoparticles;

injecting the enzyme-based green solvent and the carrier fluid into a well;

directing the enzyme-based green solvent and the carrier fluid down a flow path of the well;

guiding the nanoparticles via magnetic field to a plurality of targeted regions in a rock formation;

soaking the enzyme-based green solvent and the carrier fluid in the rock formation;

reversing the flow path of the well wherein the enzyme-based green solvent and the carrier fluid travel up the flow path; and recovering a plurality of deposits from the well.

2. The method according to claim 1 further comprising recovering a plurality of deposits from a neighboring well in contact with the enzyme-based green solvent.

3. The method according to claim 1 wherein the slurry comprises magnetic nanoparticles.

4. The method according to claim 1 wherein the slurry comprises proppant.

5. The method according to claim 1 further comprising encapsulating the enzyme-based green solvent in the nanoparticles.

6. The method according to claim 1 further comprising releasing the enzyme-based green solvent from the nanoparticles at the targeted regions of the rock formation.

7. The method according to claim 1 further comprising a cooling tool in the well for controlling a temperature of the enzyme-based green solvent.

8. The method according to claim 1 further comprising:
coating each nanoparticle of the nanoparticle slurry with the immobilized enzyme mixture;
applying the magnetic field to a sub-surface of each nanoparticle of the nanoparticle slurry; and
guiding the nanoparticles through the well via the magnetic field to contact the subsurface fluid.

9. The method according to claim 8 wherein the liquid has an enzyme concentration of less than a critical micelle concentration (CMC).

10. The method according to claim 8 further comprising calculating a temperature in the production well for controlling an activation of enzymes in the enzyme-based green solvent.

11. The method according to claim 8 wherein the solvent is aqueous comprising more than about 90% water.

12. The method according to claim 8 wherein the solvent is non-aqueous comprising a carrier fluid wherein the carrier fluid comprises at least one of a hydrocarbon fluid, a compressed gas, or a foam.

13. A method for recovering subsurface fluid from rock formations, the method comprising the steps of:
providing a carrier fluid including an enzyme-based green solvent that is paired with a slurry of nanoparticles, wherein the enzyme-based green solvent is immobilized on the nanoparticles;
injecting the enzyme-based green solvent and the carrier fluid into a well;
directing the enzyme-based green solvent and the carrier fluid down a flow path of the well;
soaking the enzyme-based green solvent and the carrier fluid in a rock formation;
guiding the nanoparticles to a plurality of targeted regions in the rock formation;
reversing the flow path of the well wherein the enzyme-based green solvent and the carrier fluid travel up the flow path;
recovering a plurality of deposits from the well; and
monitoring a magnetic response from the nanoparticles wherein the magnetic response is adapted for modeling an arrangement of fractures at the predetermined depth of the well.

14. The method according to claim 1 further comprising a heating tool in the well for controlling a temperature of the enzyme-based green solvent for activating or deteriorating enzyme activities, wherein the heating tool is configured in the well, adjacent to at least a portion of the rock formation.

15. The method according to claim 13 wherein the slurry comprises magnetic nanoparticles.

16. The method according to claim 13 wherein the slurry comprises proppant.

17. The method according to claim 13 further comprising encapsulating the enzyme-based green solvent in the nanoparticles.

18. The method according to claim 13 further comprising releasing the enzyme-based green solvent from the nanoparticles at the targeted regions of the rock formation.

* * * * *